United States Patent [19]

Chatenet et al.

[11] Patent Number: 5,282,576
[45] Date of Patent: Feb. 1, 1994

[54] SELF-LOCKING AND REVERSIBLE MECHANISM FOR DEPLOYING THE DIVERGING PORTION OF A ROCKET ENGINE NOZZLE

[75] Inventors: Luc H. Chatenet; Pierre Desclos, both of Vernon, France

[73] Assignee: Societe Europeenne De Propulsion, Suresnes, France

[21] Appl. No.: 890,650

[22] Filed: May 28, 1992

[30] Foreign Application Priority Data

May 30, 1991 [FR] France ................ 91 06547

[51] Int. Cl.⁵ ............................. F02K 9/97
[52] U.S. Cl. ............... 239/265.33; 239/265.11; 60/271
[58] Field of Search ........ 239/265.11, 265.19, 239/265.33; 60/232, 271

[56] References Cited

U.S. PATENT DOCUMENTS

| | | | |
|---|---|---|---|
| 3,526,365 | 9/1970 | Paine | 239/265.43 |
| 4,252,286 | 2/1981 | Moorehead | 239/265.19 X |
| 4,313,567 | 2/1982 | Feight | 239/265.33 |
| 4,489,889 | 12/1984 | Inman | 239/265.33 |
| 4,676,436 | 6/1987 | Willis | 239/265.33 |

FOREIGN PATENT DOCUMENTS 2422831 11/1979 France .
2622931 5/1989 France .

Primary Examiner—Andrew Kashnikow
Assistant Examiner—William Grant
Attorney, Agent, or Firm—Weingarten, Schurgin, Gagnebin & Hayes

[57] ABSTRACT

The deployment mechanism comprises three identical operative assemblies mounted on a fixed main frame. Each operative assembly comprises a linear actuator and first and second links disposed in such a manner as to ensure self-locking in a deployed position by causing the axes of the following three hinges to pass to or slightly beyond a dead point where they are in alignment: the hinge between the main frame and a first zone of the first link; the hinge between the upstream end of the second link and a second zone of the first link; and the hinge between the downstream end of the second link and a link support mounted on the deployable portion of the nozzle. The actuator is secured and anchored to a non-deployable portion of the nozzle and it includes a drive member whose free end is hinged to a third zone of the first link, and it is deactivated in both of the final positions, i.e. when the deployable portion is deployed and when it is retracted.

19 Claims, 3 Drawing Sheets

SELF-LOCKING AND REVERSIBLE MECHANISM FOR DEPLOYING THE DIVERGING PORTION OF A ROCKET ENGINE NOZZLE

BACKGROUND OF THE INVENTION

1. Field of the Invention

The present invention relates to a self-locking and reversible mechanism for deploying the diverging portion of a rocket engine nozzle, the mechanism comprising three identical actuation assemblies mounted on a main frame fixed on a non-deployable portion of the nozzle.

It is common practice, in particular with the intermediate stages of launchers, to use rocket engine nozzles with deployable diverging portions that enable the outlet section of the nozzle to be adapted as a function of ambient pressure, which pressure falls off in going from low altitudes close to earth to high altitudes where the space vehicle leaves the earth's atmosphere, such that optimum thrust is conserved in spite of changing altitude.

The deployable portion of the nozzle must therefore be capable of being deployed automatically and reliably with minimum energy expenditure electrical, hydraulic, or pneumatic control means.

2. Prior Art

Different types of mechanism have already been proposed for deploying the deployable diverging portions of rocket engine nozzles, and in particular deployment mechanisms that are based on cable systems, ball screw systems, extensible beam systems, membrane systems, or spring systems.

Such known mechanisms are generally non-reversible, in other words once they provide a locking function, as with an extension beam system, for example, such locking in the deployed position is irreversible. These types of deployment mechanisms are therefore not adapted to vehicles such as space aircraft for which it is necessary both to deploy and to retract the diverging portion. In addition, some deployment mechanisms are fitted with electrically controled auxiliary locking devices that complicate implementation of the assembly and increase its mass.

Overall, the deployment mechanisms that have already been proposed are complex to implement, and are bulky or give rise to an increase in mass that constitutes a severe penalty for a space vehicle.

There is also known from document FR-A-2 568 316 a deployable diverging portion system having a single moving part that moves in translation parallel to the axis of the nozzle. Actuators displace the part along fixed columns disposed parallel to the axis of the nozzle.

Mechanisms have also been proposed for deploying a diverging portion that comprise actuator-and-linkage assemblies. Nevertheless, known mechanisms of this type are also bulky, not simultaneously lockable and reversible, and are not always adapted to rigid type deployable diverging portions.

Document U.S. Pat. No. 4,489,889 discloses a non-reversible deployment mechanism for the diverging portion of a rocket-engine nozzle, which mechanism makes use of an actuator associated with a linkage-and-cam system. Nevertheless, that relatively complex mechanism provides no self-locking, and in the deployed position the actuator must continue to be actuated, which tends to reduce reliability.

Document FR-A-2 622 931 describes an actuating mechanism for an extensible thrust nozzle of a rocket engine, comprising a linkage driven by actuators. The actuating mechanism described in that document includes separate control and guidance members which creates additional bulk, both in the folded position and in the extended position, without neither ensuring that the moving portion is automatically locked in its retracted and deployed positions, or providing reliable guidance on reaching its extreme retracted and deployed positions.

SUMMARY OF THE INVENTION WITH OBJECTS

The invention seeks to remedy the above-mentioned drawbacks and to provide a mechanism for deploying a deployable diverging portion of a rocket engine nozzle which is simple, lightweight, and reliable, and which provides self-locking at least in the deployed position, while nevertheless guaranteeing that the deployment operation is reversible, so as to be specially suitable for space vehicles, in particular.

These objects are achieved by a self-locking and reversible deployment mechanism for a deployable diverging portion of a nozzle extending from a combustion chamber of a rocket engine, the mechanism comprising three identical actuator assemblies mounted on a main frame fixed to said combustion chamber or to a non-deployable portion of the nozzle, Wherein, according to the present invention each operative assembly comprises:

a. a centering abutment mounted in the vicinity of the upstream edge of the deployable portion of the diverging portion, downstream from the main frame;

b. a link support mounted on said deployable portion downstream from said centring abutment;

c. a first link having a first zone hinged to said main frame;

d. a second link having an upstream end hinged to a second zone of said first link and a downstream end hinged to said link support, said second link co-operating with said centring abutment at least in the deployed position; and e. a linear actuator comprising a body secured and hinged to a non-deployable portion of the nozzle, and a moveable drive member whose free end is hinged to a third zone of said first link.

The first and second links of the actuator are disposed in such a manner as to ensure self-locking in the deployed position by reaching, or slightly exceeding, a dead point in which the following points are in alignment: the hinge axes, on the main frame, of the first zone of the first link, the upstream end of the second link articulated on zone of the first link, and the downstream end of the second link articulated on the link support mounted on the deployable portion of the nozzle; the actuator is deactivated in each of the deployed and retracted final positions of the deployable portion. It is locked as soon as it is deactivated.

Preferably, the centring abutment is V-shaped and ensures that the second link is properly positioned to lock the mechanism in its deployed position.

Advantageously, the deployment mechanism co-operates with a control device designed to be activated at instants when the rocket engine is not exerting any thrust. As a result, the actuator may be a simple ram, of low power.

The main frame may for example, be fixed on the combustion chamber of the rocket engine, upstream from the throat of the nozzle or level with the throat.

However, the main frame may advantageously be fixed on a non-deployable portion of the nozzle.

The body of the actuator may itself be articulated and secured to the non-deployable portion of the nozzle upstream from the main frame.

In a first embodiment, the first and second links are rectilinear.

In this case, and according to a more specific embodiment, said third zone of the body of the first link to which the free end of the moving drive member of the actuator is hinged constitutes an intermediate zone of the body of the first link situated between said first and second zones which constitute end zones of the first link.

In order to reduce bulk in the retracted position, the second link may be longer than the first link.

In a second embodiment, which enables bulk to be reduced, the first link is curved between said first and seond zones while the second link is rectilinear.

In this case, it is preferable for said first zone of the first link which is hinged to the main frame to constitute an intermediate zone of the body of the first link situated between said second and third zones which constitute end zones of the first link.

Advantageously, said centering abutment is in contact with the second link both in the deployed final position and in the stowed final position of the deployable diverging portion.

In general, the deployment mechanism of the invention is remarkable in that the system locks automatically in the deployed position in integrated manner after going through the point where the links are in alignment, without requiring any additional complex or fragile mechanical member to be added and without preventing reversibility.

BRIEF DESCRIPTION OF THE DRAWINGS

Embodiments of the invention are described by way of example with reference to the accompanying drawings, in which.

DETAILED DESCRIPTION OF PARTICULAR EMBODIMENTS

Figure 1:
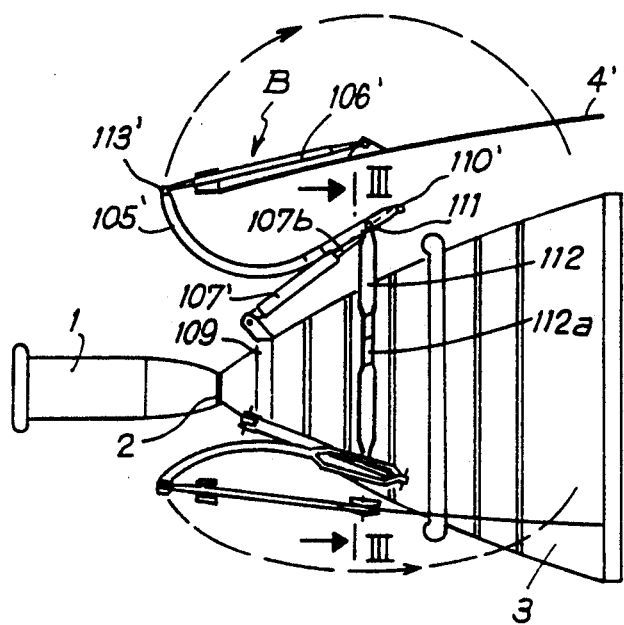
FIG. 1 is an elevation view of a rocket engine nozzle fitted with a first embodiment of a deployment mechanism of the invention, with the diverging portion of the nozzle being shown in its stowed position.
Figure 3:
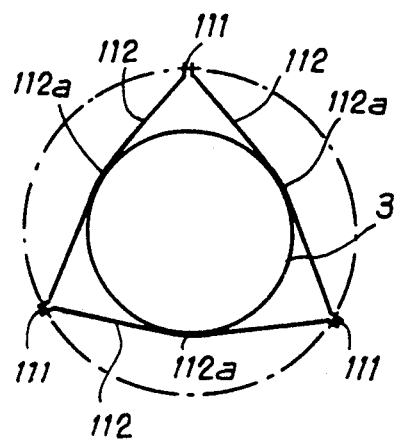
FIG. 3 is a diagrammatic cross-section view on line III—III of FIG. 1 showing the disposition of a frame of the deployment mechanism of the invention.

The present invention relates to a mechanism for deploying a deployable diverging portion of a rocket engine nozzle of the type comprising three operative assemblies A, B, C (FIG. 4) distributed around a nozzle 1 to 4 of a rocket engine and controlled synchronously to deploy or retract a deployable diverging portion 4 which extends a non-deployable diverging portion 3 itself running on from a nozzle throat 2 following a combustion chamber 1.

Referring more particularly to the preferred embodiment of FIGS. 1 to 4 and 6, it can be seen that the three operative assemblies A, B, and C are identical and are mounted symmetrically about the axis of the engine assembly, to a main frame 112 which is fixed on a non-deployable portion 3 of the nozzle. The three operative assemblies A, B, and C are thus disposed so as to be mutually spaced apart at 120° intervals.

The main frame (FIG. 3) is essentially constituted by a triangular structure 112 comprising three elements fixed in their middles 112a on the non-deployable portion 3 of the nozzle, which elements may be made of composite materials, in particular.

The ends of the three elements constituting the vertices of the triangular frame 112 define support forks for the hinge pins of links 105 in zones referenced 111.

Each operative assembly A, B, and C thus includes a curved first link 105 (FIGS. 1, 2, 4, and 6) hinged in a first zone 111 to the main frame 112 and having two end zones likewise provided with hinge pins.

The end zone of the link 105 that is closest to the first zone 111 and that is joined to said first zone via a length that is rectilinear or nearly rectilinear is itself hinged to the free end 110 of the rod 107b of an actuator 107 whose body 107a has its base hinged at 108 to a support 109 which is secured to the non-deployable diverging portion 3 in an intermediate zone between the main frame 112 and the throat 2 of the nozzle.

The end zone of the link 105 which is joined to the first zone 111 via a curved portion is hinged to an upstream end 113 of a rectilinear second link 106 whose downstream end 114 is hinged to a link support 115 mounted on the deployable portion 4 of the diverging portion of the nozzle, which deployable portion 4 may be made of composite materials, as may the fixed portion 3.

As can be seen in FIGS. 1, 2, 4, and 6, for each operative assembly A, B, and C, a V-shaped centering abutment 121 is fixed in the vicinity of the upstream edge of the deployable portion 4.

The centering abutment 121 is thus located in an intermediate position between the main frame 112 and the support for the link 115.

Figure 4:
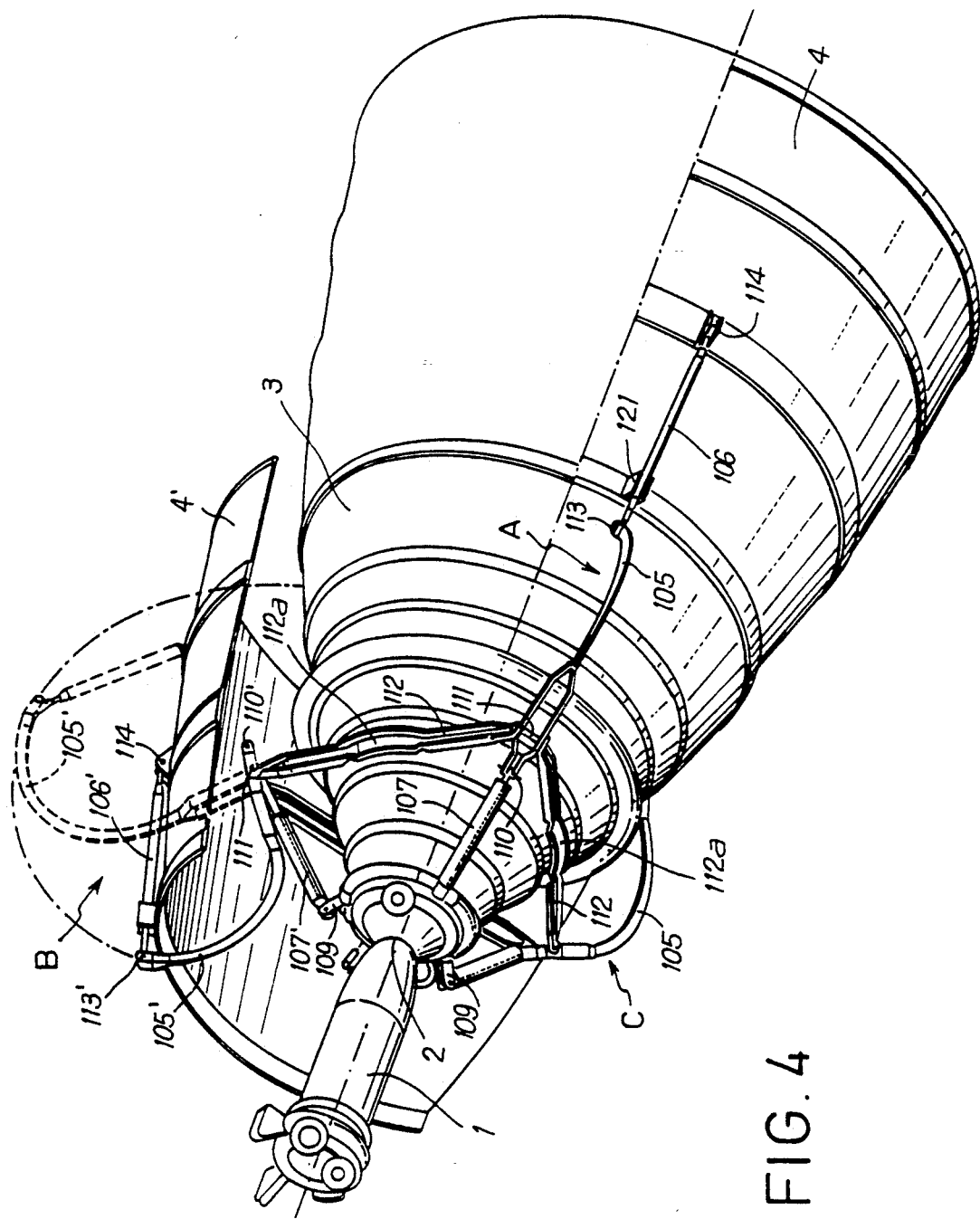
FIG. 4 is a perspective view of the same embodiment of a nozzle as shown in FIGS. 1 and 2.

The second link 106 engages the V-shaped abutment 121 via its upstream portion adjacent to the hinged upstream end 113, both when the diverging portion 3, 4 of the nozzle is in its final deployed position (FIG. 2 and bottom portion of FIG. 4) and when it is in its final retracted position (FIG. 1 and top portion of FIG. 4).

When the diverging portion is in its deployed position (low position), the V-shaped abutment 121 serves to center the second link 106 while limiting the radial stroke thereof, and thus avoiding deformation of the nozzle that could arise due to radial compression from each of the links 106.

When the diverging portion is in its retracted position (high position), the V-shaped abutments 121 serve to stabilize the deployable portion 4 when it surrounds the fixed portion 3 and the throat 2 of the nozzle.

Figure 2:
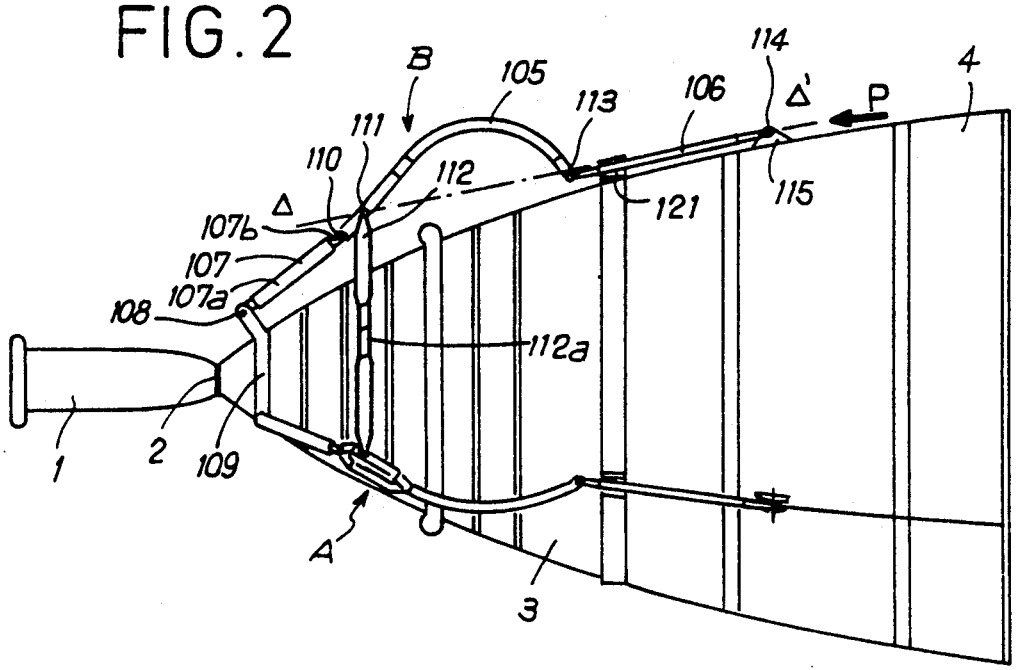
FIG. 2 is an elevation view similar to FIG. 1, but with the diverging portion in its deployed position.

With reference more particularly to FIG. 2, it can be seen that when the diverging portion 3, 4 of the nozzle is in its deployed position, the links 105 and 106 are in a braced or a near-braced position which ensures that the mechanism is automatically locked in this position and which enables the actuator 107 to be deactivated. The deployment mechanisms nevertheless remains reversible and, by reactivating the actuator 107 to extend the actuator rod 107b, the diverging portion of the nozzle can be returned to its retracted position as shown in FIG. 1, where the mechanism is again locked and the actuator 107 can again be deactivated.

In order to ensure that the moving element 4 of the diverging portion of the nozzle is subjected to satisfactory translation, it is appropriate in each of the operative assemblies A, B, and C for two of the three hinges listed below to be of the cylindrical type with mutually parallel axes that are perpendicular to the axis of the nozzle, while the third one of said hinges is constituted by a ball-and-socket hinge. The three hinges in each operative assembly are: the hinge between the first link 105 and the zone 111 of the main frame, the hinge between the first link 105 and the upstream end 113 of the second link 106, and the hinge between the downstream end 114 of the second link 105 and the link support 115. For example, it is preferable for the ball-and-socket type hinge to be the hinge between the first link 105 and the second link 106, while the other two hinges are of the cylindrical type. With three operative assemblies A, B, and C, each constituted by an actuator 107 and two links 105 and 106, the number of degrees of freedom for ensuring an isostatic assembly thus corresponds to six forks and three ball-and-socket hinges.

Figure 6:
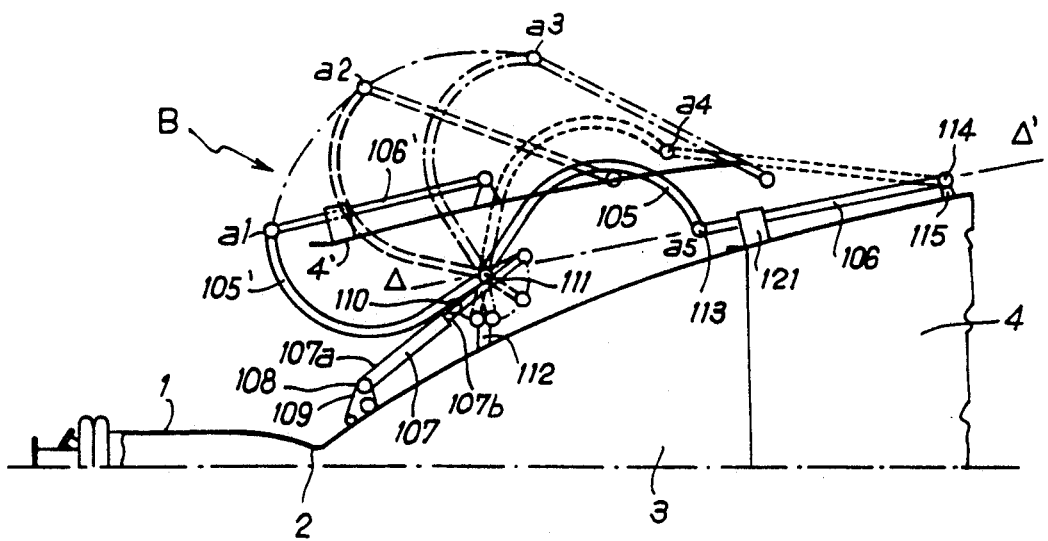
FIG. 6 is an axial half-section view of the nozzle of FIGS. 1 to 4 showing a deployment mechanism placed in various different successive positions.

In FIGS. 1, 4, and 6, the same reference numerals are used to designate the moving elements both when in the deployed position (e.g. FIG. 2) and when in the retracted position; but to facilitate understanding of the operation of the mechanism, the numerals are accompanied by a prime symbol when they are shown in the retracted position.

FIG. 6 shows the links 105 and 106 in a plurality of intermediate positions between the final positions where the diverging portion 4 is stowed or deployed. Successive positions a1 to a5 taken up by the hinge 113 between the links 105 and 106 during a deployment operation can thus be seen. In the final position a5, self-locking is ensured by the hinge 113 passing slightly beyond the bracing position, i.e. beyond the dead-center point where all three hinges 111, 113, and 114 are in alignment on a line $\Delta\Delta'$ (FIGS. 2 and 6), i.e. the hinge axes of the zone 111 between the first link 105 and the main frame 112, between the upstream end 113 of the second link 106 and the first link 105, and between the downstream end 104 of the second link 106 and the link support 115 are moved into alignment and then braced past it.

In FIG. 2, arrow P shows the direction of the thrust force exerted by the rocket engine while it is operating. This thrust force acts on the hinge axes 111, 113, and 114 in a manner that tends to keep the mechanism self-locked in the deployed position because of the position taken up by the links 105 and 106 which is such that the hinge axis 113 is positioned beyond the dead point lying on the axis $\Delta\Delta'$.

It is particularly advantageous for the deployment mechanism of the invention to be actuated when the rocket engine is not exerting thrust.

Under such circumstances, the actuator rams may be of low-power provided they are only required to deploy or retract the moving elements without taking account of thrust forces, and when the nozzle is in either of its final positions, (deployed or retracted) engine thrust itself ensures self-locking and enables the actuators to be deactuated.

The actuators 107 may be of various different types, for example they may be electrical or they may be of the ball screw type, for example.

According to a particular feature of the present invention, the linear actuators 107 are locked as soon as they are deactivated.

A deactivated actuator can be locked, if it is a hydraulic actuator, or possibly a pneumatic actuator, by closing the pipework leading to the two chambers situated on opposite sides of the piston.

If the actuator is a screw actuator, with or without balls and regardless of the source of driving force, then upon deactivation, the screw pitch automatically ensures locking because of the friction between the screw and the nut.

The body 107a of the actuator 107 may be hinged and secured to the combustion chamber 1 or, as shown in FIGS. 1, 2, 4, and 6, to a non-deployable portion 3 of the diverging portion of the nozzle, upstream from the main frame 112. The body 107a of the actuator 107 may be hinged either by means of independent forks or else by means of forks secured to a secondary frame. The latter is in turn either independent from or secured to the main frame 112 which, as shown in FIGS. 1, 2, 4, and 6, is advantageously mounted on the non-deployable portion 3 of the diverging portion of the nozzle. However, it may alternatively be fixed to the combustion chamber 1.

The deployment mechanism of the invention may be used on any engine that requires a moving diverging portion. Such a mechanism can thus be used on the engines of the first, second, or third stage of a launcher, or it can be used on the engines of space vehicles that are required to travel in space and then enter into a kind of shuttle or orbital station where, for reasons of bulk, it is advantageous for the downstream end of the diverging portion of the nozzle to be retracted around a smaller-section upstream portion.

When applied to a cryogenic engine, the levers 105 and 106, and the triangular frame 112 fixed on the stationary end of the diverging portion are cold.

The entire deployment mechanism of the invention may be of low mass, e.g. of the order of about 15 kg for a rocket engine providing thrust of 70 kN, thereby contributing to obtaining a highly favorable mass budget.

The invention can be embodied in various different ways. For example, it is possible, in each actuating assembly A, B, and C of the deployment mechanism to use an assembly comprising an actuator 7 and two rectilinear links 5 and 6 as shown in FIG. 5, instead of an actuator 107, a curved link 105, and a rectilinear link 106, as described above.

This second embodiment tends to be a little more bulky than the first embodiment when in the stowed position, specifically because the link 5 is not curved.

However, the volume occupied in the stowed position may continue to be acceptable, in particular if the second link 6 is longer than the first link 5.

Figure 5:
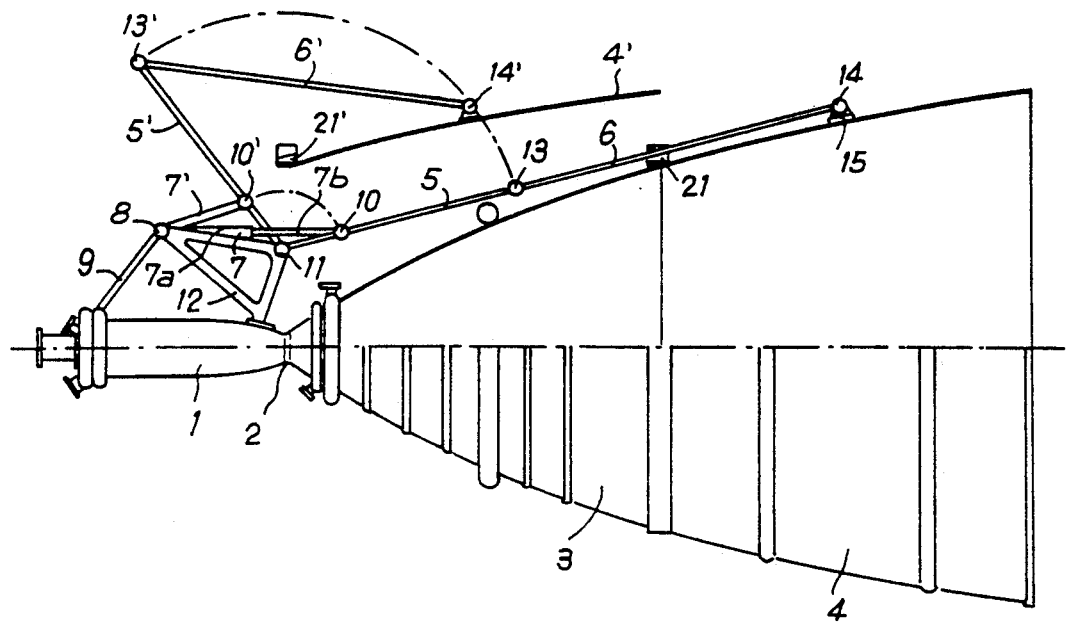
FIG. 5 is an elevation and half-axial section view of a rocket engine nozzle showing a second embodiment of a deployment mechanism of the invention, with only one of three identical deployment assemblies being shown.

In the embodiment of FIG. 5, the dispositions of the main frame 12 and of the actuator 7 are likewise slightly different from those of the abovedescribed embodiment.

Thus, as can be seen in FIG. 5, the main frame 12 is fixed on the combustion chamber 1 of the rocket engine, slightly upstream from the throat 2 of the nozzle, instead of being fixed on the diverging portion of the nozzle.

The support 9 for the body 1a of the actuator 7 is likewise mounted on the combustion chamber 1 and is connected to the main frame 12 to reinforce it by means of triangular bracing.

In the embodiment of FIG. 5, the free end 10 of the actuator rod 7b is hinged to a zone of the first link 5 which constitutes an intermediate zone between the end zones of said link 5 which are respectively hinged at a zone 11 to the main frame 12 and to the upstream end 13 of the second link 6 whose downstream end 14 is hinged, as in the embodiment of FIGS. 1 to 4, to a support 15 mounted on the deployable portion 4 of the nozzle.

A V-shaped abutment 21 placed in the vicinity of the rim of the deployable portion 4 of the nozzle serves to center and limit the stroke of the link 6 when the nozzle is in the deployed position, as in the embodiment of FIGS. 1 to 4. In contrast, when the nozzle is in the retracted position (where the corresponding reference numerals are accompanied by the prime symbol in FIG. 5), i.e. when the actuator rod 7b is retracted into the body 7, then, as shown in FIG. 5, the second link 6' is not engaged in the abutment 21' when it is desired to limit the clearance required by the links 5' and 6' towards the nozzle support when the diverging portion of the nozzle is in its stowed position.

We claim:

1. A self-locking and reversible deployment mechanism for a deployable diverging portion of a nozzle extending a combustion chamber of a rocket engine, the mechanism comprising:
   three identical operative assemblies mounted on a main frame fixed on one of said combustion chamber and a non-deployable portion of the nozzle, wherein, said operative assemblies are movable from a retracted state to an extended state and back to said retracted state in accordance with flight conditions, each operative assembly including:
   a. a centering abutment mounted in the vicinity of the upstream edge of the deployable diverging portion of the nozzle, downstream from the main frame;
   b. a link support mounted on said deployable portion downstream from said centering abutment;
   c. a first link having a first zone and a second zone, said first zone being hinged to said main frame;
   d. a second link having an upstream end hinged to said second zone of said first link and a downstream end hinged to said link support, said second link co-operating with said centering abutment at least in the deployed position; and
   e. a linear actuator comprising a body secured and hinged to a non-deployable portion of the nozzle, moveable drive member whose free end is hinged to a third zone of said first link, and means for both retracting and extending said drive member in accordance with said flight conditions; and
   wherein the first and second links of the actuator are disposed in such a manner as to ensure self-locking in the deployed position by at least reaching a dead point in which the following points are in alignment: the hinge axes on the main frame of the first zone of the first link; the upstream end of the second link articulated on the second zone of the first link; and the downstream end of the second link articulated on the link support mounted on the deployable portion of the nozzle; and
   wherein the actuator is in a deactivated mode in each of the deployed and retracted final positions of the deployable portion.

2. A mechanism according to claim 1, wherein for each operative assembly, the centering abutment is V-shaped and ensures that the second link is properly positioned to lock the mechanism in its deployed position.

3. A mechanism according to claim 1, wherein for each operative assembly, the actuator is lockable as soon as it is deactivated.

4. A mechanism according to claim 1, wherein the mechanism co-operates with a control device designed to be activated at instants when the rocket engine is not exerting any thrust, and wherein for each operative assembly, the actuator is of low power.

5. A mechanism according to claim 1, wherein for each operative assembly, the first and second links are rectilinear.

6. A mechanism according to claim 5, wherein for each operative assembly, the second link is longer than the first link.

7. A mechanism according to claim 1, wherein said main frame is fixed on the combustion chamber of the rocket engine upstream from the throat of the nozzle.

8. A mechanism according to claim 1, wherein for each operative assembly, said third zone of the first link to which the free end of the moving drive member of the actuator is hinged constitutes an intermediate zone of the body of the first link situated between said first and second zones which constitute end zones of the first link.

9. A mechanism according to claim 1, wherein for each operative assembly, the first link is curved between said first and second zones, whereas the second link is rectilinear.

10. A mechanism according to claim 1, wherein for each operative assembly, the hinge between the first link and the main frame, and the hinge between the second link and the link support have axes that are mutually parallel and perpendicular to the axis of the nozzle, whereas the hinge between the first link and the second link is constituted by a ball-and-socket hinge.

11. A mechanism according to claim 1, wherein said main frame is fixed on the combustion chamber of the rocket engine level with the throat of the nozzle.

12. A self-locking and reversible deployment mechanism for a deployable diverging portion of a nozzle extending a combustion chamber of a rocket engine, the mechanism comprising:
   three identical operative assemblies mounted on a main frame fixed on said combustion chamber, said operative assemblies being movable from a retracted state to an extended state and back to said retracted state in accordance with flight conditions, each operative assembly including:
   a centering abutment mounted in the vicinity of the upstream edge of the deployable diverging portion, downstream from the main frame;
   a link support mounted on said deployable portion downstream from said centering abutment;
   a first link having a first zone and a second zone, said first link curved between said first and said second zone, said first zone hinged to said main frame;
   a rectilinear second link, having an upstream end hinged to said second zone of said first link and a downstream end hinged to said link support, said second link co-operating with said centering abutment at least in the deployed position; and a linear actuator comprising a body secured and hinged to a non-deployable portion of the nozzle, and a moveable drive member whose free end is hinged to a third zone of said first link; and wherein the first and second links of the actuator are disposed in such a manner as to ensure self-locking in the deployed position by at least reaching a dead point in which the following points are in alignment: the hinge axes on the main frame of the first zone of the first link; the upstream end of the second link articulated on the second zone of the first link; and the downstream end of the second link articulated on the link support mounted on the deployable portion of the nozzle; and wherein the actuator is in a deactivated mode in each of the deployed and retracted final positions of the deployable portion.

13. A mechanism according to claim 12, wherein for each operative assembly, said first zone of the first link which is hinged to the main frame constitutes an intermediate zone of the first link situated between said second and third zones which constitute end zones of the first link.

14. A mechanism according to claim 12, wherein for each operative assembly, said centering abutment is in contact with the second link both in the deployed final position and in the retracted final position of the deployable diverging portion.

15. A mechanism according to claim 12, wherein said nozzle further comprises a non-deployable diverging portion to which said main frame is fixed.

16. A mechanism according to claim 15, wherein for each operative assembly, the body of the actuator is itself hinged and secured to the non-deployable portion of the diverging portion of the nozzle, upstream from the main frame.

17. A self-locking and reversible deployment mechanism for a deployable diverging portion of a nozzle extending a combustion chamber of a rocket engine, the mechanism comprising:

three identical operative assemblies mounted on a main frame fixed on said combustion chamber, said operative assemblies being movable from a retracted state to an extended state and back to said retracted state in accordance with flight conditions, each operative assembly including:

a centering abutment mounted in the vicinity of the upstream edge of the deployable diverging portion, downstream from the main frame;

a link support mounted on said deployable portion downstream from said centering abutment;

a first link having a first zone and a second zone, said first zone hinged to said main frame;

a second link, having an upstream end hinged to said second zone of said first link and a downstream end hinged to said link support, said second link co-operating with said centering abutment at least in the deployed position; and a linear actuator comprising a body secured and hinged to a non-deployable portion of the nozzle, and a moveable drive member whose free end is hinged to a third zone of said first link; and wherein the first and second links of the actuator are disposed in such a manner as to ensure self-locking in the deployed position by at least reaching a dead point in which the following points are in alignment: the hinge axes on the main frame of the first zone of the first link; the upstream end of the second link articulated on the second zone of the first link; and the downstream end of the second link articulated on the link support mounted on the deployable portion of the nozzle;

wherein the actuator is in a deactivated mode in each of the deployed and retracted final positions of the deployable portion; and wherein the hinge between the first link and the main frame, and the hinge between the second link and the link support have axes that are mutually parallel and perpendicular to the axis of the nozzle, whereas the hinge between the first link and the second link is constituted by a ball-and-socket hinge.

18. A self-locking and reversible deployment mechanism for a deployable diverging portion of a nozzle extending a combustion chamber of a rocket engine, the mechanism comprising:

three identical operative assemblies mounted on a main frame fixed on said combustion chamber, said operative assemblies being movable from a retracted state to an extended state and back to said retracted state in accordance with flight conditions, each operative assembly including:

a V-shaped centering abutment mounted in the vicinity of the upstream edge of the deployable diverging portion, downstream from the main frame, said centering abutment ensuring that the second link is properly positioned to lock the mechanism in its deployed position;

a link support mounted on said deployable portion downstream from said centering abutment;

a first link having a first zone and a second zone, said first zone hinged to said main frame;

a second link having an upstream end hinged to said second zone of said first link and a downstream end hinged to said link support, said second link co-operating with said centering abutment at least in the deployed position; and a linear actuator comprising a body secured and hinged to a non-deployable portion of the nozzle, and a moveable drive member whose free end is hinged to a third zone of said first link; and wherein the first and second links of the actuator are disposed in such a manner as to ensure self-locking in the deployed position by at least reaching a dead point in which the following points are in alignment: the hinge axes on the main frame of the first zone of the first link; the upstream end of the second link articulated on the second zone of the first link; and the downstream end of the second link articulated on the link support mounted on the deployable portion of the nozzle; and wherein the actuator is in a deactivated mode in each of the deployed and retracted final positions of the deployable portion.

19. A self-locking and reversible deployment mechanism for a deployable diverging portion of a nozzle extending a combustion chamber of a rocket engine, the mechanism comprising:

three identical operative assemblies mounted on a main frame fixed on said combustion chamber, said operative assemblies being movable from a retracted state to an extended state and back to said retracted state in accordance with flight conditions, each operative assembly including:

a centering abutment mounted in the vicinity of the upstream edge of the deployable diverging portion, downstream from the main frame;

a link support mounted on said deployable portion downstream from said centering abutment;

a first rectilinear link having a first zone and a second zone, said first zone hinged to said main frame;

a second rectilinear link longer than said first link, having an upstream end hinged to said second zone of said first link and a downstream end hinged to said link support, said second link cooperating with said centering abutment at least in the deployed position; and a linear actuator comprising a body secured and hinged to a non-deployable portion of the nozzle, and a moveable drive member whose free end is hinged to a third zone of said first link; and wherein the first and second links of the actuator are disposed in such a manner as to ensure self-locking in the deployed position by at least reaching a dead point in which the following points are in alignment: the hinge axes on the main frame of the first zone of the first link; the upstream end of the second link articulated on the second zone of the first link; and the downstream end of the second link articulated on the link support mounted on the deployable portion of the nozzle; and wherein the actuator is in a deactivated mode in each of the deployed and retracted final positions of the deployable portion.

* * * * *